July 12, 1927.

H. K. WHITEHORN 1,635,598

ELECTRIC VEHICLE TRANSMISSION

Filed March 29, 1923    2 Sheets-Sheet 1

Inventor
H. K. Whitehorn,
by
Attorney.

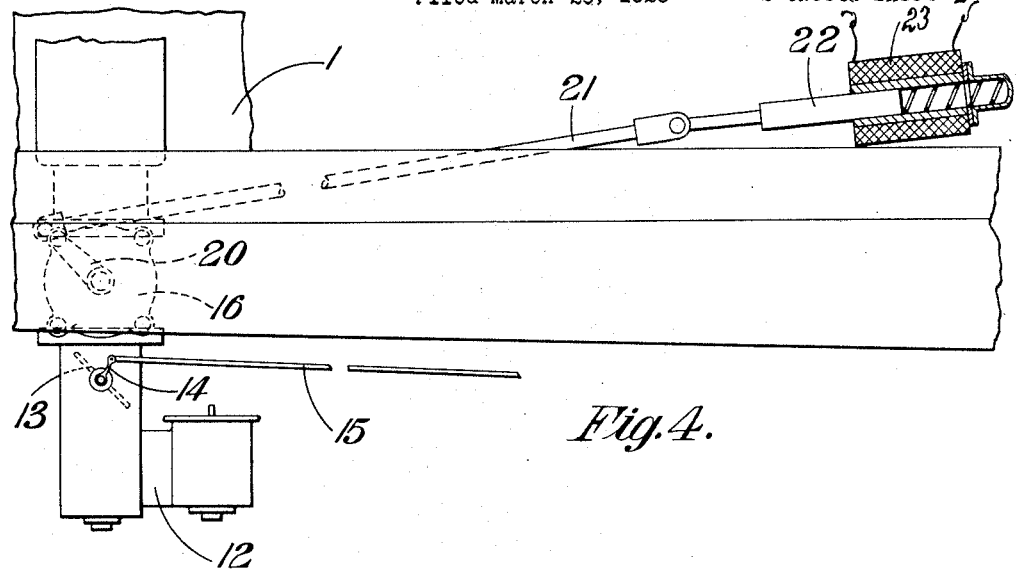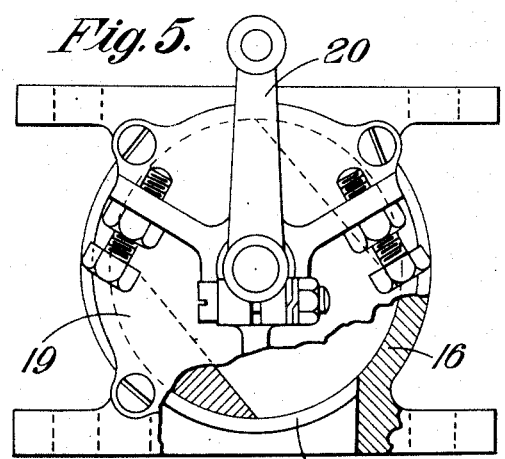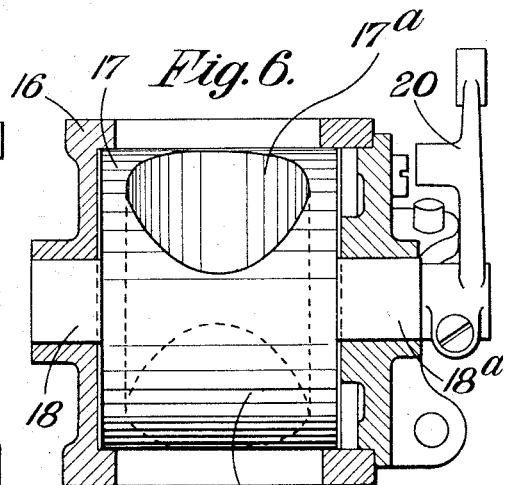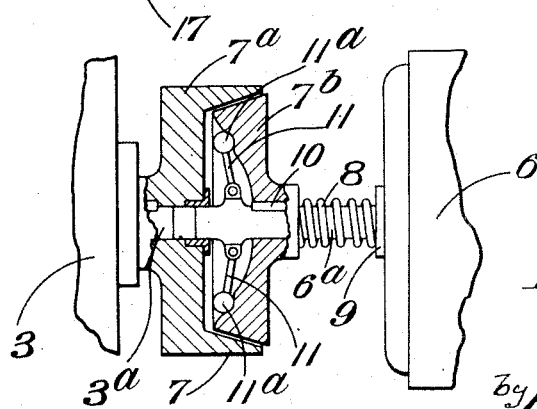

Patented July 12, 1927.

1,635,598

UNITED STATES PATENT OFFICE.

HAROLD KENNETH WHITEHORN, OF MAIDSTONE, ENGLAND, ASSIGNOR TO TILLING-STEVENS MOTORS LIMITED, OF MAIDSTONE, KENT, ENGLAND.

ELECTRIC VEHICLE TRANSMISSION.

Application filed March 29, 1923, Serial No. 628,582, and in Great Britain March 31, 1922.

This invention relates to electric transmission for vehicles. In a transmission system in which an internal combustion engine drives a dynamo and the current generated is taken to a motor or motors driving a Cardan shaft or the wheels direct, it is the general aim to utilize the full power of the engine when necessary at all speeds of the road wheels and for this purpose various control arrangements have been proposed such for instance as the use of a variable resistance in series with the shunt field of the dynamo, described for example in British Specification No. 104,819. It is an object of the present invention to provide improvements having the above general aim, and more particularly to effect it by means of an auxiliary current generator or exciter as hereinafter described and claimed.

According to this invention an auxiliary current generator or exciter is driven at a speed dependent upon that of the road wheels and is so connected as automatically to increase or decrease the voltage of the main generator as the speed of the vehicle increases or decreases. Preferably the auxiliary generator is in the form of an exciter in series with the field winding of the main generator.

Referring to the drawings:—

Fig. 4 shows means by which the engine throttle may be controlled by currents available in the system in addition to the normal hand or foot throttle control.

Fig. 5 is a view to enlarged scale of the electrically controlled throttle device.

Fig. 6 is a transverse section of the view shown in Fig. 5.

Figure 7 is a detail view of a slipping clutch device by means of which the voltage is limited at high speeds of the vehicle.

Figure 1:
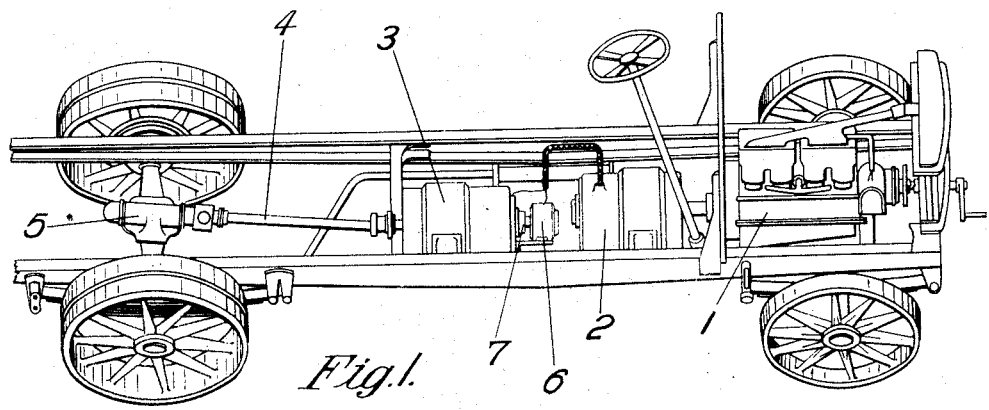
Fig. 1 is a perspective view indicating the transmission from engine to back axle.
Figure 2:
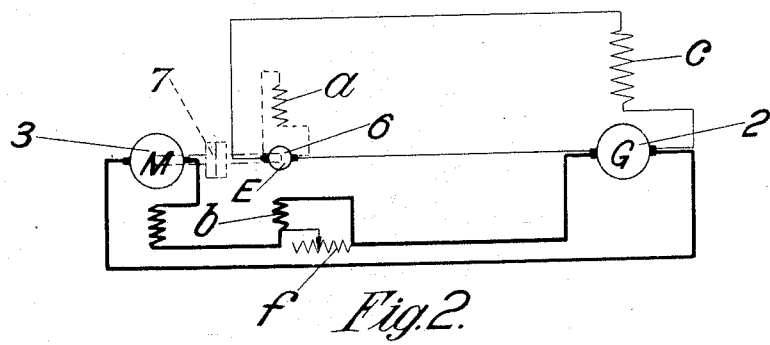
Fig. 2 is a wiring diagram.
Figure 3:
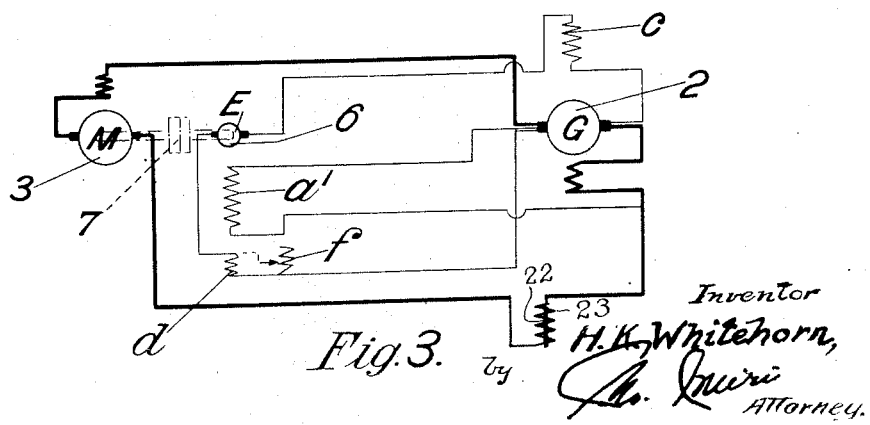
Fig. 3 is an alternative wiring diagram.

In the illustrated example of a transmission system in accordance with the invention, a petrol engine 1 is direct coupled to a shunt (or slightly compound) wound dynamo 2. The current generated by the dynamo is carried to a series wound motor 3 coupled to a Cardan shaft 4 from which the power is transmitted through worm and differential gears 5 to the back wheels. Mounted on an extension of the shaft of the main motor or otherwise driven from it (preferably through a slipping clutch 7) is the armature of an exciter 6 the field of which is shown provided with field coils $a$ and in addition some turns of a reversed winding $b$ (preferably adapted to be short circuited at starting) shunted from the main current to the driving motor. These field coils $a$ may if required be in two sections, one self-excited and one such as $a^1$ (Fig. 3) excited from the armature of the main dynamo or otherwise separately excited. As an alternative (as shown at Fig. 3) the armature G and E of the main dynamo 2 and the exciter 6, the shunt fields $c$ of the dynamo, and the series fields $d$ of the exciter form a closed circuit. The voltage generated by the exciter is superimposed on the shunt winding of the dynamo and it will be seen that in this manner the strength of the dynamo fields is so related to the speed and to the torque exerted by the motor as to enable the engine to run at its economic speed automatically under a large variety of conditions. An adjustable divert $f$ is indicated as a possible addition. In order to prevent the generator voltage from becoming excessive at very high road speeds any suitable means may be provided for limiting the voltage of the exciter. For example the exciter may be driven through a clutch 7 centrifugally operated to slip as a predetermined speed is reached. This clutch device is shown in detail at Fig. 7, wherein $7^a$ represents an internally coned member driven by the shaft $3^a$ of the motor 3, and $7^b$ is a cone adapted to engage frictionally with the member $7^a$ when pressed into engagement by the spring 8 carried between the member $7^b$ and a collar 9 formed on the shaft $6^a$ of the auxiliary generator 6. The member $7^b$ is freely slidable on the shaft $6^a$ but is prevented from rotating relatively to it by means of the key or spline 10. Weighted arms 11, 11, are pivoted on the shaft 6ᵃ so that when the latter reaches a predetermined speed, the centrifugal force presses the weights 11ᵃ, 11ᵃ, against the member 7ᵇ sufficiently to overcome the pressure of the spring 8 and to take the member 7ᵇ out of engagement with the driving member 7ᵃ as illustrated in the drawing. The engine throttle may be automatically controlled by an electro-magnetic device operated by currents available in the system, for example the main current to the electric motor.

A means for accomplishing this is illustrated at Figs. 4, 5, and 6. 12 represents the carburetor of the engine 1 and an ordinary butterfly throttle 13 is operated by means of lever 14 and rod 15 leading to the hand or foot control. In addition, there is provided an additional throttle device comprising a cylinder 16 with a revolving barrel 17 having a circular bore 17ᵃ extending through it. The barrel 17 is supported on spindles 18, 18ᵃ, and to an extension of the spindle 18ᵃ outside the cover 19 of the cylinder there is attached a lever 20 which is connected by means of a rod 21 to the core 22 of a solenoid provided with a winding 23 disposed in the main circuit between motor and generator (see Fig. 3).

In operation, when starting, the road wheels are stationary and accordingly there is no supplementary excitation of the generator. Where the electrically controlled throttle is employed, this is opened as the current of the motor increases so that if necessary full engine power is available at comparatively low voltage, thus giving maximum current and torque for starting. As the vehicle gets going, the exciter 6 starts to generate and increases the voltage of the generator which again tends to increase the speed of the vehicle. The speed is thus automatically increased up to the maximum obtainable from the engine power; when the desired speed is attained, the throttle is brought into operation to such an extent that the engine is only giving the necessary output to maintain that speed. Where the electrically controlled throttle is employed, the engine is automatically throttled as the current in the motor falls. It will be understood that when the vehicle is running on a down gradient there might be a tendency to generate excessive voltage owing to the high speed of the road wheels, but this tendency is overcome by means of the centrifugal device described with reference to Fig. 7, whereby the driving connection between the road wheels and the exciter is broken as soon as the latter reaches a predetermined speed.

It is to be understood that the invention is not intended to be limited to the specific embodiments mentioned, but to include other arrangements within the spirit of the invention and the scope of the appended claims.

I claim:—

1. In an electric transmission system of the kind set forth a vehicle comprising an engine, electrical generating means driven by said engine and adapted to absorb the maximum power output thereof and having a field provided with a winding, and an armature, electric motor means adapted to be supplied with current from said armature and to absorb the whole power output thereof, an auxiliary generator, means to drive said auxiliary generator at a speed dependent upon that of the vehicle, means to supply current from said auxiliary generator to said winding, said auxiliary generator being so connected and arranged that it varies the electromotive force of the generator inversely with the torque demand of the motor together with means under the control of the driver to control the power-output of the engine for the purpose of regulating the motor speed.

2. In a vehicle having an engine, a generator driven by said engine and having an armature and shunt field windings, a motor supplied with current from said armature, an auxiliary generator driven at a speed dependent upon that of said motor, and connections whereby the voltage of the auxiliary generator is superimposed upon the shunt field windings.

3. The combination with a vehicle having the combination of parts set forth in claim 1 of means to limit the maximum speed attainable by the auxiliary generator.

4. The combination with a vehicle having the combination of parts set forth in claim 1 of a series winding in series with the armature of the auxiliary generator adapted to excite said auxiliary generator.

5. The combination with a vehicle having the combination of parts set forth in claim 1 of an adjustable divert affecting the excitation of the auxiliary generator permanently to adjust the characteristic of the auxiliary generator to individual systems so that a permanent adjustment may be given to a standard generator to give the exact automatic effect required irrespective of slight individual variations in the other elements of the system.

6. A vehicle comprising an engine, a generator driven thereby and having an armature and shunt field coils, a motor driven by current supplied from said generator, an exciter having an armature and series field coils, means to drive said exciter at a speed dependent upon that of said motor, and connections forming a closed circuit including the armatures of the generator and exciter, shunt field coils of the generator and the series field coils of the exciter.

7. A self-contained self-propelled vehicle, said vehicle carrying an engine driving a dynamo, said dynamo supplying current to drive an electric motor which is free from mechanical connection with the dynamo and arranged to rotate at speeds either below or above dynamo speed, an exciter connected to increase the field strength of the dynamo, means to drive the exciter at a speed dependent upon motor speed and means to control the power output of the engine, and supplemental means to regulate said last-named means in accordance with the current being supplied to the motor at any particular time.

In testimony whereof I affix my signature.

HAROLD KENNETH WHITEHORN.